Figure 3:
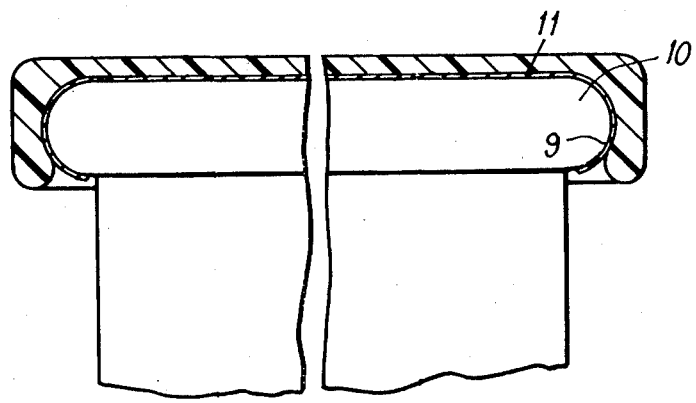

United States Patent [19]

Nelms

[11] 4,190,187
[45] Feb. 26, 1980

[54] TUBULAR CONTAINERS
[75] Inventor: Thomas G. Nelms, London, England
[73] Assignee: Rolex Paper Company Ltd., Slough, England
[21] Appl. No.: 923,904
[22] Filed: Jul. 12, 1978
[30] Foreign Application Priority Data
Jul. 20, 1977 [GB] United Kingdom ............... 30536/77
[51] Int. Cl.² ........................... B65D 3/04; B65D 5/04
[52] U.S. Cl. ..................................................... 229/5.5
[58] Field of Search .................. 229/4.5, 5.5, 5.6, 5.7, 229/43

[56] References Cited
U.S. PATENT DOCUMENTS

| | | | |
|---|---|---|---|
| 1,649,569 | 11/1927 | Carle | 229/5.6 X |
| 1,711,642 | 5/1929 | Hulbert | 229/5.5 X |
| 1,787,332 | 12/1930 | Wright | 229/5.5 |
| 2,314,338 | 3/1943 | Graves et al. | 229/5.5 X |
| 3,406,891 | 10/1968 | Buchner et al. | 229/5.5 X |

FOREIGN PATENT DOCUMENTS

| | | | |
|---|---|---|---|
| 572832 | 3/1959 | Canada | 229/5.5 |
| 623499 | 7/1961 | Canada | 229/5.7 |

Primary Examiner—Davis T. Moorhead
Attorney, Agent, or Firm—Scully, Scott, Murphy & Presser

[57] ABSTRACT

The invention provides a tubular container whose wall at at least one end is curled over to form a bead for engagement with a closure, the said curled over end portion of the container wall being of thinner gauge than the adjacent wall portion. The container can have a foil diaphragm secured across the beaded end, and may have a reusable overcap or lid engaging around the bead and closing the beaded end of the container. The beaded end of containers according to the invention is more durable than that of prior constructions, and can provide a better seat for a sealing diaphragm.

11 Claims, 4 Drawing Figures

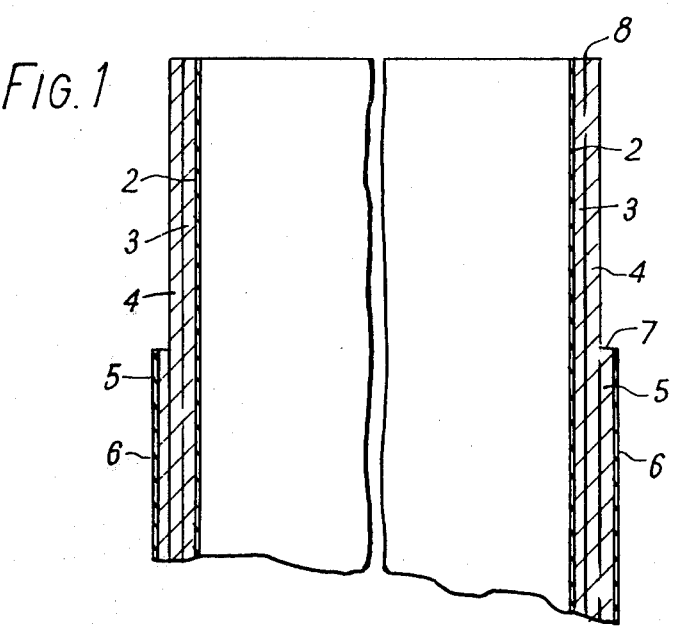
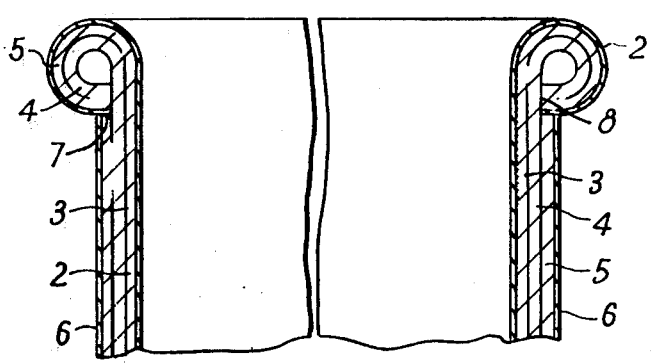

TUBULAR CONTAINERS

This invention relates to tubular containers, and in particular to such a container whose wall at at least one end is curled over to form a bead for engagement with a force-fit or slip-over closure.

In known containers of this type, the quality and durability of the bead is unsatisfactory. The end of the container wall is usually curled over in a tight inverted U and the exposed edges readily break up and fibrillate on repeated application and removal of the closure.

According to the present invention, the end portion of the container wall which is curled over to form a bead is of thinner gauge than the adjacent wall portion. For example where the tubular wall is of multi-ply construction, e.g. comprises a plurality of plies of kraft or paperboard, one or some of the plies of the wall may be absent around the end portion of the tubular wall; the said ply or plies may for example be removed from an initially uniform tubular wall by grinding, skiving, or cutting; when the multi-ply tube is formed, the ply or plies which are to be removed may be left unadhered or unbonded to the remainder at the region or regions where ply removal is to be effected.

The thinner gauge end portion of the tubular wall will normally be curled outwardly to form a radially outwardly projecting peripheral bead, but it would be possible to curl the end portion inwardly to provide instead a radially inwardly projecting peripheral bead. Where the thinner gauge end portion of the tubular wall is or is to be curled outwardly, its radially outer face is preferably offset radially inwardly relative to the radially outer face of the adjacent full gauge portion of the wall to provide a shoulder or land therebetween (e.g. in a multi-ply tubular container, at least one external ply is removed from around the end of the tube), and the thinner gauge end portion is curled outwardly into a tight bead e.g. with the edge of the thinner gauge portion returned into contact with the radially outer surface of this portion adjacent to the said shoulder or land, the said edge thus being protected and unexposed. In another embodiment the thinner gauge portion is curled further, through more than 270°, so that its free end is wholly within the resulting bead. For an inwardly curled bead, the radially inner surface of the end portion would preferably be correspondingly offset radially outwardly from the adjacent inner face of the tube, with the edge of the inwardly curled over portion likewise protected.

The tubular container according to the invention will normally be of circular section, but other (usually curvilinear or mainly curvilinear) sections are possible. The container may have an innermost barrier ply, e.g. of plastics or metal foil. A foil diaphragm, e.g. of aluminum, may be secured (e.g. heat sealed or by hot melt adhesive) across the beaded end of the container and an overcap or lid (preferably of a flexible material and suitably of plastics e.g. polyethylene) may be supplied for reclosure.

An important advantage provided by the invention is that the bead presents a larger surface area for adhesion to a diaphragm rim than do the prior inverted U types of bead, thus facilitating the application of such a diaphragm and improving the reliability of the bead/diaphragm seal obtained.

The diaphragm may be of any of a large number of materials, and may be coated with any of a wide range of coatings—including for example heat activatable, cold sealing, pressure sensitive or other adhesives and waxes for effecting a seal with the bead.

Figure 4:
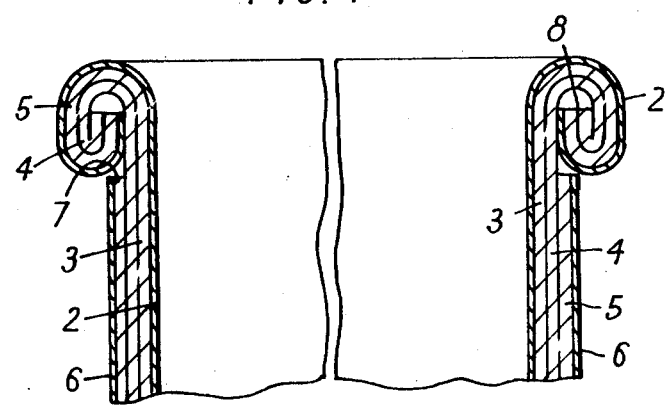

The invention is illustrated, by way of example only, in the accompanying drawings in which:

FIGS. 1 and 2 illustrate schematically and in sectional view for formation and structure of the beaded end of a container according to the invention, FIG. 1 showing a tube with an open end ready for the bead formation and FIG. 2 showing a bead formed at that open end, FIG. 3 is a sectional view through a completed and closed container according to the invention, and FIG. 4 is a view, similar to that of FIG. 2, illustrating a second embodiment.

The tubular wall of the container shown in FIGS. 1 and 2 of the drawings has an inner barrier ply 2 of aluminium foil, surrounded by three plies 3, 4 and 5 of spirally wound, 0.009" thick, Kraft paper. Around the Kraft plies is a spirally wound outermost ply 6 of paper or paperboard which may be coloured or printed etc. As indicated in FIG. 1, at the end where the bead is to be formed, the outermost ply 6 and the outer Kraft ply 5 are removed, e.g. by grinding, skiving or cutting, plies 5 and 6 preferably having been applied dry to ply 4 in this region. Removal of plies 5 and 6 leaves a shoulder or land 7 between the reduced gauge end portion and the adjacent full gauge portion of the tubular wall. The reduced gauge end portion is curled outwardly of itself to form a tight bead, with the end edge 8 curled back into engagement with the reduced gauge portion adjacent to the should 7 which protects the edge 8 from exposure and wear and tear in use.

As indicated in FIG. 3, a thin die-cut aluminium foil diaphragm 9 may be heat sealed to the bead 10 to close this end of the container, a standard polyethylene overcap 11 being provided for engagement with the bead 10 for reclosure. The Figure illustrates the relatively large surface area of bead 10, allowing a large contact area with the rim of diaphragm 9 and hence ensuring an effective seal.

The other end of the tubular container will normally be permanently closed in any convenient manner.

The FIG. 4 embodiment is the same as that of FIGS. 1 and 2 (like reference numerals being used for like parts) except that the thinner end portion is curled over further so that its distal end lies substantially parallel to the tube wall and is wholly within and protected by the bead formed. The bead is also flattened somewhat relative to that of FIG. 2, having a greater dimension axially than radially of the tube. The FIG. 4 tube can be provided with a foil closure and lid as in FIG. 3.

The invention is described above mainly in terms of a multi-ply tube, at least one outer or inner ply of which is removed at an end portion of the tube to provide the end wall portion which is curled over to form the bead. Within the general concept of the invention, however, which merely requires the said end portion to be of thinner gauge than the adjacent wall portion, other methods of achieving this reduced gauge are possible. For example, a single- (or multi-) ply tube could have the reduced gauge end portion formed by pressure grooving the corresponding end of the tube of initially uniform wall thickness; this procedure could be applied to individual preformed tubes of uniform wall thickness, or a continuously produced tube of uniform wall thickness could be pressure grooved peripherally at spaced regions along its length and then severed transversely to give individual tubes each having an appropriate tube end. In another embodiment according to the invention, a plurality of coaxial tubes in peripheral contact may be longitudinally arranged or re-arranged so that at least one radially inner or outer tube projects longitudinally to provide the said end portion of thinner gauge.

I claim:

1. A tubular container whose wall at at least one end is of thinner gauge than, and radially offset relative to, the adjacent wall portion, said thinner gauge wall portion being curled over through more than 270 degrees to constitute a bead occupying the area of said radial offset and projecting radially therefrom for sliding engagement with a closure.

2. A tubular container according to claim 1 wherein the said end wall portion of thinner gauge is one made by pressure-grooving.

3. A tubular container according to claim 1 wherein the said end wall portion of thinner gauge is one formed by grinding, skiving, or cutting around the said wall portion of an initial uniform tubular wall.

4. A tubular container according to claim 1 of multiply construction.

5. A tubular container according to claim 4 wherein at least one of the plies of the wall is absent around the said end wall portion.

6. A tubular container according to claim 1 wherein the thinner gauge end portion of the tubular wall is curled outwardly to form a radially outwardly projecting peripheral bead.

7. A tubular container according to claim 1 wherein the thinner gauge end portion of the tubular wall is curled inwardly to form a radially inwardly projecting peripheral bead.

8. A tubular container according to claim 1 which is of circular section.

9. A tubular container according to claim 1 which has an innermost barrier ply.

10. A tubular container according to claim 1 having a foil diaphragm secured across the beaded end.

11. A tubular container according to claim 1 having a reusable overcap or lid engaging around the bead and closing the beaded end of the container.

* * * * *